(12) United States Patent
Fischer et al.

(10) Patent No.: US 7,792,114 B2
(45) Date of Patent: Sep. 7, 2010

(54) SIGNALING EXTENDED FUNCTIONALITY AND MANAGEMENT INFORMATION IN A NETWORK

(76) Inventors: Michael Andrew Fischer, 22 Inwood Manor, San Antonio, TX (US) 78248-1632; Timothy Gordon Godfrey, 12839 King St., Overland Park, KS (US) 66213

( * ) Notice: Subject to any disclaimer, the term of this patent is extended or adjusted under 35 U.S.C. 154(b) by 1446 days.

(21) Appl. No.: 10/830,570

(22) Filed: Apr. 23, 2004

(65) Prior Publication Data

US 2005/0025173 A1 Feb. 3, 2005

Related U.S. Application Data

(60) Provisional application No. 60/491,342, filed on Jul. 30, 2003.

(51) Int. Cl.
*H04L 12/28* (2006.01)
*H04L 12/56* (2006.01)

(52) U.S. Cl. .................................................. 370/392

(58) Field of Classification Search ................. 370/445, 370/395.4, 433, 458, 466, 467, 468, 493
See application file for complete search history.

(56) References Cited

U.S. PATENT DOCUMENTS

| | | | |
|---|---|---|---|
| 5,077,732 A | 12/1991 | Fischer et al. | |
| 5,546,444 A | 8/1996 | Roach, Jr. et al. | |
| 6,172,980 B1 * | 1/2001 | Flanders et al. | 370/401 |
| 6,477,156 B1 | 11/2002 | Ala-Laurila et al. | |
| 6,490,292 B1 * | 12/2002 | Matsuzawa | 370/401 |
| 7,310,688 B1 * | 12/2007 | Chin | 709/252 |
| 7,346,026 B2 * | 3/2008 | Sherman et al. | 370/328 |
| 2001/0040895 A1 | 11/2001 | Templin | |
| 2002/0181426 A1 * | 12/2002 | Sherman | 370/338 |
| 2003/0214905 A1 * | 11/2003 | Solomon et al. | 370/229 |
| 2004/0057439 A1 * | 3/2004 | Ould-Brahim | 370/400 |
| 2004/0083293 A1 * | 4/2004 | Chen et al. | 709/227 |

OTHER PUBLICATIONS

T. Pusateri, RFC 1469—IP Multicast over Token-Ring Local Area Networks, Jun. 1993, p. 2.*
Jim Geier, Understanding 802.11 Frame Types, Aug. 2002, pp. 2-3.*
802 IEEE Standard for Local and Metropolitan Area Networks Overview and Architecture, Mar. 8, 2002, The Institute of Electrical and Electronics Engineers, Inc., IEEE Std 802-2001, pp. 6 and 19-21.*

* cited by examiner

*Primary Examiner*—Chirag G Shah
*Assistant Examiner*—Ashley L Shivers

(57) ABSTRACT

A technique is disclosed for conveying extended functionality control and management information in networks. Enhanced stations encode the control and management information in pre-existing messages. In accordance with the illustrative embodiment of the present invention, the enhanced stations perform the encoding without the need to create nonstandard or proprietary frame formats. Unenhanced stations that are present in the same network as enhanced stations react to the encoded information in a benign way.

33 Claims, 5 Drawing Sheets

SIGNALING EXTENDED FUNCTIONALITY AND MANAGEMENT INFORMATION IN A NETWORK

CROSS-REFERENCE TO RELATED APPLICATIONS

This application claims the benefit of U.S. provisional application Ser. No. 60/491,342, filed Jul. 30, 2003, entitled "Use of OUI to Convey Information in a Wireless Network," which is herein incorporated by reference.

FIELD OF THE INVENTION

The present invention relates to telecommunications in general, and, more particularly, to local area networks (LAN).

BACKGROUND OF THE INVENTION

FIG. 1 depicts a schematic diagram of wireless local-area network (LAN) 100 in the prior art. Wireless local-area network 100 comprises stations 102-1 through 102-K, wherein K is a positive integer, and shared-communications channel 103. Stations 102-1 through 102-K are typically associated with host computers (not shown), such as notebook computers, personal digital assistants (PDA), tablet PCs, etc. Stations 102-1 through 102-K enable communications between (i) the host computers or (ii) the host computers and other devices, such as printer servers, email servers, file servers, etc.

Stations 102-k, for k=1 through K, transmit data blocks called "frames" over shared-communications channel 103. If two or more stations transmit frames simultaneously, then those frame transmissions can interfere with each other, resulting in what is called a "collision". Local-area networks, therefore, typically employ a medium access control (MAC) protocol for ensuring that a station can gain exclusive access to shared-communications channel 103 for an interval of time in order to transmit one or more frames. A "protocol" is a set of communications procedures that relate to the format and timing of transmissions between different stations.

In wireless local-area networks that are based on the Institute of Electrical and Electronics Engineers (IEEE) 802.11 standard, the medium access control protocol is based on a mechanism called "carrier sense multiple access" (CSMA), in which station 102-k can detect whether shared-communications channel 103 is busy or idle. If shared-communications channel 103 is busy, station 102-k will wait until the channel is idle before attempting to transmit a signal that conveys a frame. Meanwhile, station 102-k monitors shared-communications channel 103 and reads the address information contained in each transmitted frame to determine if another station is transmitting a frame to station 102-k.

Protocols that are based on a specific standard, such as IEEE 802.11, comprise a standard set of functions, as well as the messages that support those functions. All stations that are built to a specific standard use the messages in that standard so that those stations are able to understand each other. As long as all stations in the same network (e.g., network 100, etc.) are built to the same standard, they can all understand each other.

Sometimes, it is desirable to add enhanced functionality to at least some of the stations in a network. For example, a network operator or user might want some of the stations in the network to control each other or exchange data in an enhanced way. Often the added functionality requires that stations communicate additional information to each other. The difficulty in adding functionality to a standardized protocol is that once the standard has been ratified—and manufactured to—it is extremely difficult, if not impossible, to change the standardized protocol to accommodate the added functions.

Therefore, the need exists for a way of conveying extended functionality control and management information without some of the disadvantages and costs in the prior art.

SUMMARY OF THE INVENTION

The present invention is a technique for signaling extended functionality and management information in an existing network without some of the disadvantages and costs in the prior art. In the illustrative embodiment of the present invention, enhanced stations convey information to each other through the use of specially-encoded medium access control (MAC) layer addresses. Each specially-encoded address comprises a first address subfield and a second address subfield. The first address subfield represents a specific set of control functions, and the second address subfield represents a specific control function within the set specified by the first address subfield.

The specially-encoded address is conveyed by a message from a common message set (e.g., IEEE 802.11, etc.). Using a common message ensures basic compatibility, in that all stations, both enhanced and unenhanced, at least reads the address contained in the message. Each unenhanced station, upon not recognizing the address as its own, correctly behaves according to the protocol of the common message set. A control frame, in particular, can be used to convey the address field because (i) control frames are short, thereby minimizing the impact on network performance, and (ii) stations interpret control frames in a benign way.

In some embodiments, the first address subfield is associated with an organizationally unique identifier (OUI) that, in turn, represents a specific set of control functions. The organizationally unique identifier is registered with an overseeing agency, such as the IEEE, so that no two organizations use the same organizationally unique identifier for their own, different purposes. The organizationally unique identifier is regarded as a universally-administered address, which means that a specific lot of enhanced stations can be programmed and then used to support the specific control function set, either in the same network or in multiple networks that all require the same enhanced functionality.

The technique in the illustrative embodiment of the present invention is minimally-impacting on station operations. Network operators can typically pre-configure a group address matching table within an enhanced station to monitor for a particular address value or range of values. The monitoring can occur regardless of whether or not the lower-level hardware or firmware of the stations is aware of any specific function indicated in second address subfield of arriving frames. When a match occurs between the value in an arriving frame and the value stored in the group address matching table, the station passes at least a portion of the arrived frame to higher-level firmware or software or both. The higher-level processing can then handle the specific function or functions that are signaled in the second address subfield, independent of the lower-level processing in the station.

The technique in the illustrative embodiment of the present invention is also minimally-impacting on network operations. Network operators can choose to add or swap in enhanced stations in a network that already has unenhanced stations. Network operators can also start with only enhanced stations in a network and add unenhanced stations, if a need to do so exists. The technique maintains compatibility in a mixed network.

An illustrative embodiment of the present invention comprises: (a) receiving via a shared-communications channel a first message that comprises an address field, wherein: (i) the address field comprises a first address subfield and a second address subfield, and (ii) the content of the first address subfield is associated with a specific control function set; and (b) decoding information in the second address subfield, wherein the decoding of the information is based on the specific control function set.

DETAILED DESCRIPTION

Figure 1:
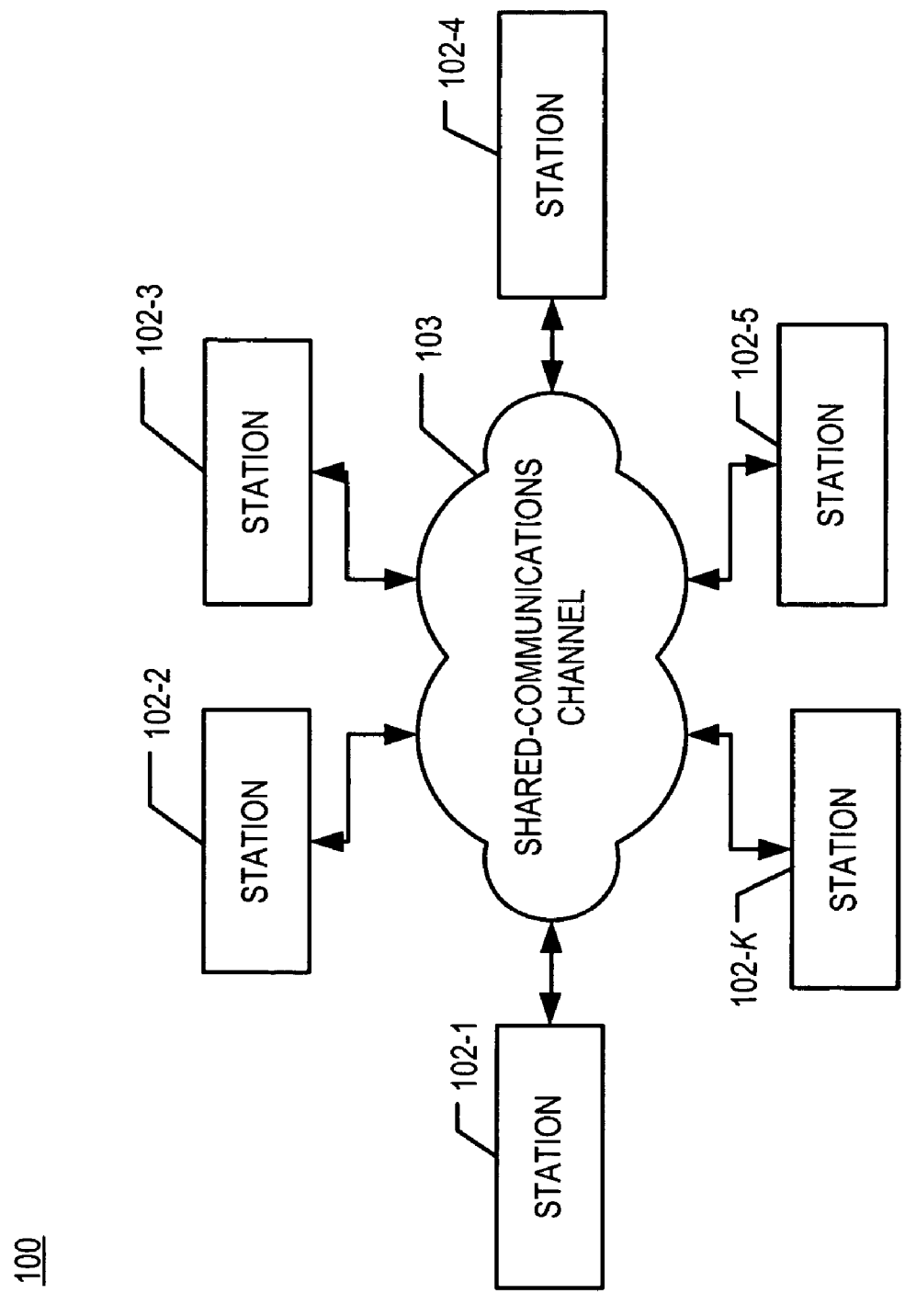
FIG. 1 depicts a schematic diagram of wireless local area network 100 in the prior art.
Figure 2:
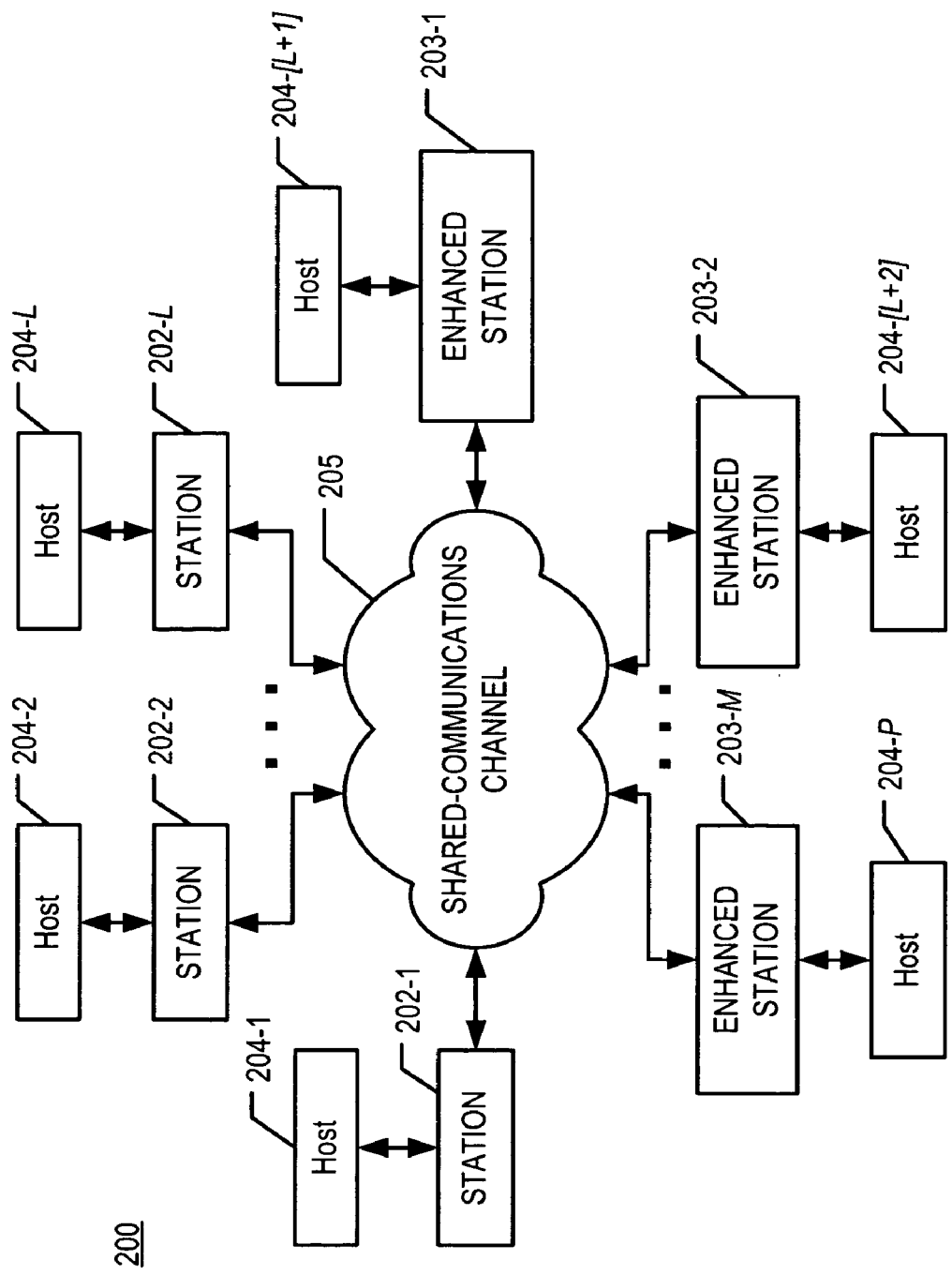
FIG. 2 depicts a schematic diagram of a portion of network 200 in accordance with the illustrative embodiment of the present invention.

FIG. 2 depicts a schematic diagram of network 200 in accordance with the illustrative embodiment of the present invention. Network 200 comprises unenhanced stations (or simply "stations") 202-1 through 202-L, wherein L is a positive integer; enhanced stations 203-1 through 203-M, wherein M is a positive integer; host computers 204-1 through 202-P, wherein P is a positive integer equal to L plus M; and wireless shared-communications channel 205, interconnected as shown. In some embodiments, network 200 is a wireless local area network.

Stations 202-1 through 202-L and enhanced stations 203-1 through 203-M operate in accordance with an IEEE 802.11 standard. It will be clear, however, to those skilled in the art, after reading this specification, how to make and use embodiments of the present invention that operate in accordance with other protocols. Furthermore, it will be clear to those skilled in the art, after reading this specification, how to make and use embodiments of the present invention that use a wireline or tangible shared-communications channel.

Station 202-$i$, where i is between 1 and L, inclusive, comprises a radio that enables host computer 204-$i$ to communicate with other devices via shared-communications channel 205. Station 202-$i$ is capable of receiving data blocks from host computer 204-$i$ and transmitting over shared-communications channel 205 messages (e.g., frames, packets, etc.) that comprise the data received from host computer 204-$i$. Station 202-$i$ is also capable of receiving messages via shared-communications channel 205 that originate from other devices and sending to host computer 204-$i$ data blocks that comprise data from the messages. It will be clear to those skilled in the art how to make and use station 202-$i$.

Enhanced station 203-$m$, where m is between 1 and M, inclusive, comprises a radio that enables host computer 204-($m$+L) to communicate with other devices via shared-communications channel 205. As a device will added capability relative to station 202-$i$, enhanced station 203-$m$ processes data blocks in accordance with the illustrative embodiment of the present invention. Enhanced station 203-$m$ is capable of receiving data blocks from host computer 204-($m$+L) and transmitting over shared-communications channel 205 messages (e.g., frames, packets, etc.) that comprise the data received from host computer 204-($m$+L). Enhanced station 203-$m$ is also capable of receiving messages via shared-communications channel 205 that originate from other devices and sending to host computer 204-($m$+L) data blocks that comprise data from the messages. The salient details for enhanced station 203-$m$ are described below and with respect to FIG. 3. It will be clear to those skilled in the art, after reading this specification, how to make and use enhanced station 203-$m$.

Host computer 204-$p$, where p is between 1 and P, inclusive, is capable of generating data blocks and transmitting those data blocks to station 202-$p$ or enhanced station 203-$j$, where j is equal to (p–L). Host computer 204-$p$ is also capable of receiving data blocks from station 202-$p$ or enhanced station 203-$j$, and of processing and using the data contained within those data blocks. Host computer 204-$p$ can be, for example, a desktop or a laptop computer that uses network 200 to communicate with other hosts and devices. It will be clear to those skilled in the art how to make and use host computer 204-$p$.

(Unenhanced) stations 202-$i$, for i=1 through L, and enhanced stations 203-$m$, for m=1 through M, communicate directly with each other, in accordance with the illustrative embodiment. The stations are able to communicate with each other in various combinations (i.e., unenhanced station-to-unenhanced station, unenhanced station-to-enhanced station, enhanced station-to-enhanced station, and enhanced station-to-unenhanced station). In other embodiments, communications between stations pass through an access point. It will be clear to those skilled in the art how to make and use an access point.

Because station 202-$i$ is unenhanced, any communication that involves at least one station 202-$i$ occurs by using a common message set of standard messages. Standard messages include a data frame, a control frame, a maintenance frame, etc. All stations that constitute network 200 use the same version of IEEE 802.11 (e.g., 802.11b, etc.) and, therefore, use the common message set associated with that version of IEEE 802.11.

Figure 3:
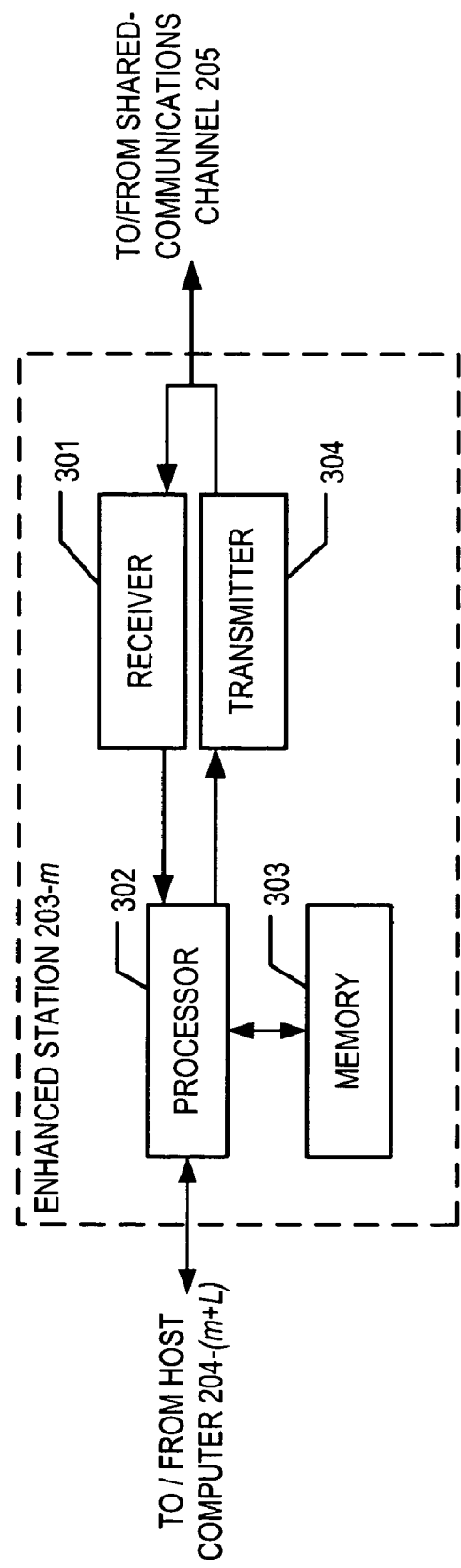
FIG. 3 depicts a block diagram of the salient components of enhanced station 203-$m$ in accordance with the illustrative embodiment of the present invention.

FIG. 3 depicts a block diagram of the salient components of enhanced station 203-$m$ in accordance with the illustrative embodiment of the present invention. Enhanced station 203-$m$ comprises receiver 301, processor 302, memory 303, and transmitter 304, interconnected as shown.

Receiver 301 is a circuit that is capable of receiving messages from shared-communications channel 205, in well-known fashion, and of forwarding them to processor 302. It will be clear to those skilled in the art how to make and use receiver 301.

Processor 302 is a general-purpose processor that is capable of performing the tasks described below and with respect to FIGS. 4 and 5. It will be clear to those skilled in the art, after reading this specification, how to make and use processor 302.

Memory 303 is capable of storing programs and data used by processor 302. It will be clear to those skilled in the art how to make and use memory 303.

Transmitter 304 is a circuit that is capable of receiving messages from processor 302, in well-known fashion, and of transmitting them on shared-communications channel 205. It will be clear to those skilled in the art how to make and use transmitter 304.

An example now follows, in which enhanced station 203-1 and enhanced station 203-2 communicate with each other as part of the local-area network of ACME, Inc., a fictitious organization.

Enhanced stations 203-1 and 203-2 communicate with each other by using one or more encoded messages, each of which comprise an address field, as is known in the art. The address field comprises a destination address of the station that will deliver at least a portion of the message to higher protocol layers for processing. One example of a destination address is a 48-bit medium access control [MAC] layer address, as is known in the art. It will be clear to those skilled in the art how to represent a value that is treated by other stations as a destination address by using the address field.

The encoded message appears superficially to unenhanced stations 202-*i*, for i=1 through L, to be a standard message that belongs to the common message set of network 200. Station 202-*i* monitors shared-communications channel 205, in well-known fashion, for messages that are addressed to station 202-*i*. During the monitoring activity, station 202-*i* detects the encoded message, checks the address field of the encoded message, and determines that the message is not intended for station 202-*i*.

Figure 4:
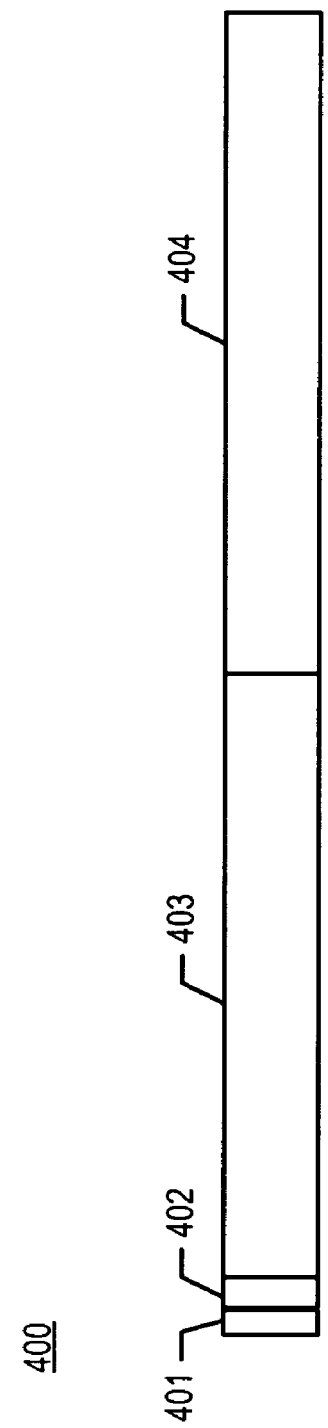
FIG. 4 depicts address field 400 in accordance with the illustrative embodiment of the present invention.

The address field, referred to as an "info-address," comprises subfields that are depicted in FIG. 4 and used in accordance with the illustrative embodiment of the present invention. FIG. 4 depicts address field 400 that comprises:

i) I/G indicator 401, an indicator of an individual or a group address;
ii) U/L indicator 402, an indicator of a universally or locally administered address;
iii) first address subfield 403; and
iv) second address subfield 404.

I/G indicator 401 is set to indicate a "group" address, as is known in the art. The group that is referred to in this context comprises multiple stations. The group address indication signifies that address field 400 is directed at more than one station (i.e., is a "multicast" address). The group in the example comprises enhanced stations 203-*m*, for m=1 through M.

Upon detecting that a group address is indicated in an arriving frame, all receiving stations, both enhanced and unenhanced, compare the address field value with their known group address lists that have been stored in a matching table, in well-known fashion. When a match occurs between the value in an arriving frame and a value stored in the group address matching table, the station then acts on control information that is encoded in the frame.

In other embodiments, I/G indicator 401 indicates without ambiguity an "individual" address (as opposed to a "group" address). One situation in which an individual address can be used is where the encoded control information is used in a frame that is a sole or final frame of a sequence of frames. The sole or final frame is often a control frame (e.g., clear_to_send, etc.). Sometimes, group addresses are disallowed in control frames, making an individual address preferred, if not necessary.

U/L indicator 402 is set to indicate a universally-administered address. An address that is registered with an overseeing agency (e.g., the IEEE, etc.) is an example of a universally administered address. Universally-administered addresses are intended to ensure that the same address encoding is not used to represent different applications.

First address subfield 403 depicted in FIG. 4 represents a control function set. The control function set, in accordance with the illustrative embodiment, comprises one or more functions that are supported by enhanced stations 203-*m*, for m=1 through M, but not by stations 202-*i*, for i=1 through L. When first address subfield 403 indicates a specific control function, the receiving station recognizes that the transmitting station is invoking extended functionality or conveying management information or both.

In some embodiments, first address subfield 403 represents a 22-bit organizationally unique identifier (OUI). The organizationally unique identifier is registered for a particular application and forms the basis for the uniqueness of medium access control layer addresses. Organizationally unique identifiers are registered with an overseeing agency (e.g., the IEEE, etc.) that universally administers the identifiers.

Second address subfield 404 depicted in FIG. 4 is used to indicate a specific function to the destination station. The specific function indicated is part of the control function set indicated in first address subfield 403. In some embodiments, second address subfield 404 is 24 bits long.

Second address subfield 404, in some embodiments, also conveys information that indicates the intended recipient of the frame. This is particularly important in networks where multiple enhanced stations exist, but where there is only one intended recipient of a given frame. For example, second address subfield 404 can convey at least a portion the receiving enhanced station's medium access control layer address. It will be clear to those skilled in the art, after reading this specification, how to encode information as part of second address subfield 404 to indicate an intended recipient.

The relationship between first address subfield 403 and second address subfield 404 in address field 400 is further explained here. ACME, Inc., the fictitious organization in the example, requires that some of the stations on its local area network be enhanced with added functionality that allows those enhanced stations to share information in a specific, non-standard way. ACME's enhanced stations are programmed to recognize that the specific control function set that is represented by first address subfield 403 corresponds to the added functionality. One of the exemplary functions that is used by enhanced station 203-1 is the ability to request restricted data from enhanced station 203-2 that only enhanced stations may share. That specific control function (i.e., "give me special data") is specified in second address subfield 404, along with an identifier of enhanced station 203-2.

It will be clear to those skilled in the art, after reading this specification, how to make and use other control functions, in addition to requesting data as in the previous example.

Figure 5:
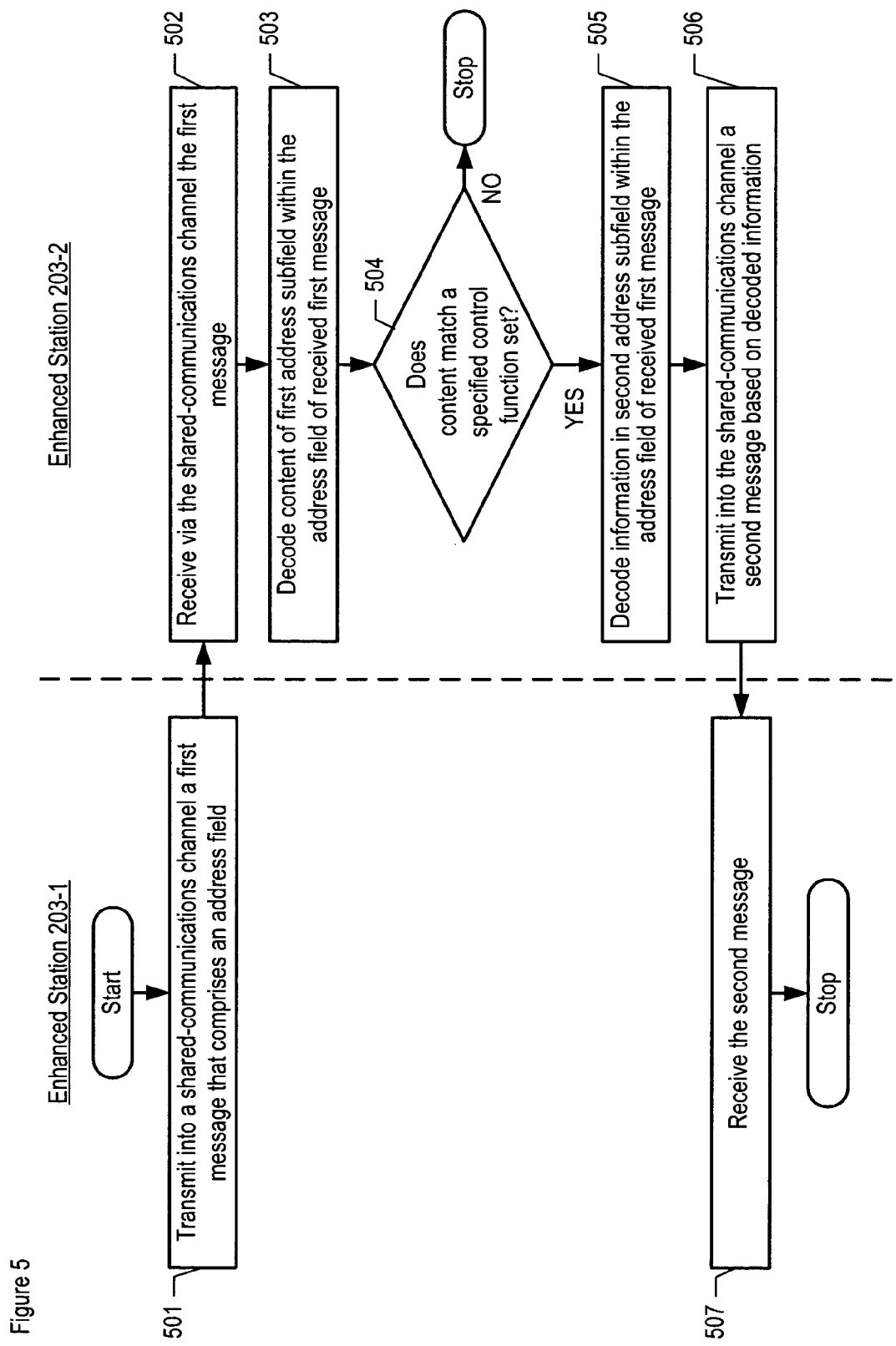
FIG. 5 depicts a flowchart of the salient tasks performed in accordance with the illustrative embodiment of the present invention.

FIG. 5 depicts a flowchart of the salient tasks performed in accordance with the illustrative embodiment of the present invention.

At task 501, enhanced station 203-1 transmits into shared-communications channel 205 a first message. In the example, the first message is a clear_to_send frame, as is known in the art. The clear_to_send frame is categorized as a control frame in the standard message set of the protocol in use. Of particular importance is that the clear_to_send frame used in this way serves mainly as a conveyance of the encoded address field information. Station 203-1 uses a clear_to_send frame, as opposed to some other frames, because it is benign to unenhanced stations.

In the example provided, the first message specifies a data request, as describer earlier. It will be clear to those skilled in the art how to transmit a message into shared-communications channel 205.

At task 502, enhanced station 203-2 receives the first message via shared-communications channel 205. It will be clear to those skilled in the art how to receive a message via shared-communications channel 205.

At task 503, enhanced station 203-2 decodes the content of the first address subfield of the received first message. It will be clear to those skilled in the art, after reading this specification, how to decode the information in the first address subfield.

At task 504, enhanced station 203-2 determines that the first address subfield represents a specific control function set—that is, ACME, Inc.'s control function set. It will be clear to those skilled in the art, after reading this specification, how to determine that the first address subfield represents a specific control function set.

At task 505, enhanced station 203-2 decodes the information in the second address subfield within the address field of the received first message. Enhanced station 203-2 decodes the information based on the specific control function set indicated in the first subfield. It will be clear to those skilled in the art, after reading this specification, how to decode the information in the second address subfield. In the example provided, enhanced station 203-2 determines that the function that is represented by the second address subfield corresponds to a request to transmit data back to the requesting station (i.e., enhanced station 203-1).

At task 506, enhanced station 203-2 transmits into shared-communications channel 205 a second message based on the decoded information in the second address subfield of the first message. The second message might or might not indicate an extended control function, that is, it might be purely a standard message, such as a data frame with a standard medium access control layer destination address that corresponds to enhanced station 203-1. It will be clear to those skilled in the art, after reading this specification, how to format and transmit the second message.

In other embodiments, enhanced station 203-2 performs another function (e.g., turns itself off, etc.) in response to having received the first message.

At task 507, enhanced station 203-1 receives the second message in well-known fashion.

Network 200 can support than one control function set for more than one application on the same network. It will be clear to those skilled in the art, after reading this specification, how to make and use networks that use multiple control function sets or multiple functions within a given set or both.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method for providing enhanced functionality in a shared-medium network comprising:
   receiving, at a first device from a second device, via a shared-communications channel a first message that comprises a destination address field containing an address different from an address of the first device, wherein:
      said destination address field comprises a first address subfield and a second address subfield, and
      the content of said first address subfield indicates a specific requested control function set that defines a predetermined set of one or more functions;
   decoding information in the first address subfield to determine the specific control function set requested;
   determining, at a first protocol layer, that the specific control function set requested is available at the first device; and
   passing at least a portion of the content of the second address field to a higher-protocol layer for processing, wherein the information from the second address subfield determines at least one function selected from the one or more functions associated with the specific control function set to be processed at the higher-protocol layer.

2. The method of claim 1, further comprising transmitting a second message from the first device to the second device, wherein the content of said second message is a result of the at least one function determined by the information from the second address subfield.

3. The method of claim 1, wherein the first message is formatted in accordance with an IEEE 802.11 protocol.

4. The method of claim 1,
   wherein the first protocol layer is a Medium Access Control (MAC) protocol layer and the destination address field is a Medium Access Control (MAC) protocol layer physical address; and
   wherein the content of said first address subfield is associated with an organizationally unique identifier that uniquely identifies a control function set in the shared-medium network.

5. The method of claim 3, wherein said first message is a control frame consistent with the IEEE 802.11 protocol.

6. An apparatus configured to provide enhanced functionality in a shared-medium network, the apparatus comprising:
   a receiver for receiving a first message from a second device via a shared-communications channel, the first message comprising a destination address field containing an address different from an address of the receiver, wherein:
      said destination address field comprises a first address subfield and a second address subfield, and
      the content of said first address subfield indicates a specific requested control function set that defines a predetermined set of one or more functions;
   a processor configured to decode information in said first address subfield to determine the specific control function set requested, to determine at a first protocol layer that the requested specific control function set requested is available, and passing at least a portion of the content of the second address field to a higher-protocol layer for processing, wherein the information from the second address subfield determines at least one function selected from the one or more functions associated with the specific control function set to be processed at the higher-protocol layer.

7. The apparatus of claim 6, further comprising a transmitter for transmitting a second message to the second device, wherein the transmitting of said second message includes a result determined by the at least one function requested by the information from the second address subfield.

8. The apparatus of claim 6, wherein the first message is formatted in accordance with an IEEE 802.11 protocol.

9. The apparatus of claim 6,
   wherein the first protocol layer is a Medium Access Control (MAC) protocol layer and the destination address field is a Medium Access Control (MAC) protocol layer physical address; and wherein the content of said first address subfield is associated with an organizationally unique identifier that uniquely identifies a control function set in the shared-medium network.

10. The apparatus of claim 8, wherein said first message is a control frame consistent with the IEEE 802.11 protocol.

11. A method for obtaining the services of an enhanced functionality device in a shared-medium network comprising:
generating a first message that comprises a Medium Access Control (MAC) protocol layer physical destination address field containing an address different from an address of the enhanced functionality device, wherein:
said destination address field comprises a first address subfield and a second address subfield,
said first address subfield contains content indicating a requested specific control function set that defines a predetermined set of one or more functions; and
said second address subfield contains content identifying at least one function selected from the one or more functions associated with the specific control function set;
encoding information in said first and second address subfields, wherein the encoding of said information is based respectively on said specific control function set and said at least one function; and
transmitting the first message via a shared-communications channel to the enhanced functionality device that supports the predetermined set of one or more functions.

12. The method of claim 11, further comprising receiving a second message from the second enhanced functionality device, wherein the second message contains information responsive to said at least one function.

13. The method of claim 11, wherein the first message is formatted in accordance with an IEEE 802.11 protocol.

14. The method of claim 11, wherein the content of said first address subfield is associated with an organizationally unique identifier that uniquely identifies a control function set in the shared-medium network.

15. The method of claim 13, wherein said first message is a control frame consistent with the IEEE 802.11 protocol.

16. The method of claim 5, wherein the content of the first message indicates one or more functions not supported by the IEEE 802.11 standard.

17. The apparatus of claim 8, wherein the content of the first message indicates one or more functions not supported by the IEEE 802.11 standard.

18. The method of claim 13, wherein the content of the first message indicates one or more functions not supported by the IEEE 802.11 standard.

19. The method of claim 1, wherein the first protocol layer is a Medium Access Control (MAC) protocol layer and the destination address field is a Medium Access Control (MAC) protocol layer physical address.

20. The method of claim 1, wherein the first and second devices are endpoint devices in the shared medium network.

21. The apparatus of claim 6, wherein the first protocol layer is a Medium Access Control (MAC) protocol layer and the destination address field is a Medium Access Control (MAC) protocol layer physical address.

22. The apparatus of claim 6, wherein the apparatus is an endpoint device in the shared medium network.

23. An apparatus configured to obtain the services of an enhanced functionality device in a shared-medium network comprising:
a transmitter for transmitting a first message to the enhanced functionality device via a shared-communications channel, the first message comprising a destination Medium Access Control (MAC) protocol layer physical address field containing an address different from an address of the enhanced functionality device, wherein:
said destination address field comprises a first address subfield and a second address subfield,
said first address subfield contains content indicating a requested specific control function set that defines a predetermined set of one or more functions; and
said second address subfield contains content identifying at least one function selected from the one or more functions associated with the specific control function set;
a processor configured to encode information in said first and second address subfields, wherein the encoding of said information is based respectively on said specific control function set and said at least one function, and to cause the transmitter to transmit the first message containing the encoded information to the enhanced functionality device that supports the predetermined set of one or more functions.

24. The apparatus of claim 23, further comprising a receiver for receiving a second message from the second enhanced functionality device, wherein the second message contains information responsive to said at least one function.

25. The apparatus of claim 23, wherein the first message is formatted in accordance with an IEEE 802.11 protocol.

26. The apparatus of claim 23, wherein the content of said first address subfield is associated with an organizationally unique identifier that uniquely identifies a control function set in the shared-medium network.

27. The apparatus of claim 23, wherein said first message is a control frame consistent with the IEEE 802.11 protocol.

28. The apparatus of claim 25, wherein the content of the first message indicates one or more functions not supported by the IEEE 802.11 standard.

29. The apparatus of claim 23, wherein the apparatus is an endpoint device in the shared medium network.

30. The method of claim 1, wherein the step of determining that the specific control function set requested is available at the first device comprises the first device comparing the contents of the destination address field to a known address list representing supported function sets and determining that at least one address from the known address list matches the contents of the destination address field.

31. The apparatus of claim 6, wherein the processor is configured to determine that the requested specific control function set requested is available by comparing the contents of the destination address field to a known address list representing supported function sets and determining that at least one address from the known address list matches the contents of the destination address field.

32. The method of claim 11, wherein said step of generating the first message further comprises setting an individual/group indicator field to indicate that the message contains a multicast address.

33. The apparatus of claim 23, wherein the first message further comprises an individual/group indicator field set to indicate that the message contains a multicast address.

* * * * *